Dec. 20, 1949          E. R. MARTENS          2,491,675
DEVICE FOR PRODUCING FLUID UNDER PRESSURE AND
FOR MAINTAINING SAID PRESSURE
Filed Nov. 22, 1943          2 Sheets-Sheet 2
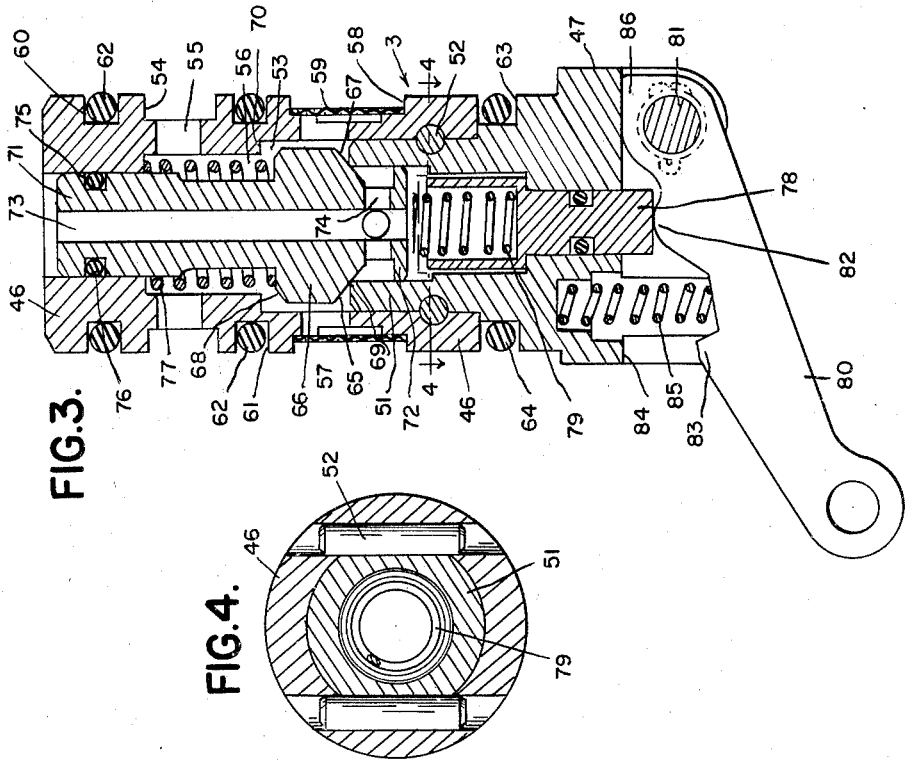
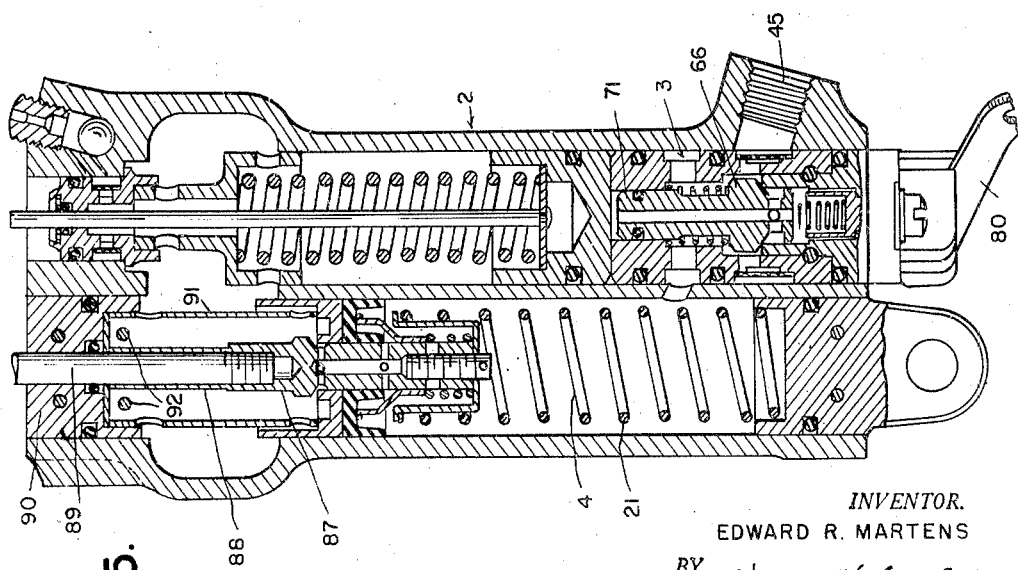
INVENTOR.
EDWARD R. MARTENS
ATTORNEYS Patented Dec. 20, 1949

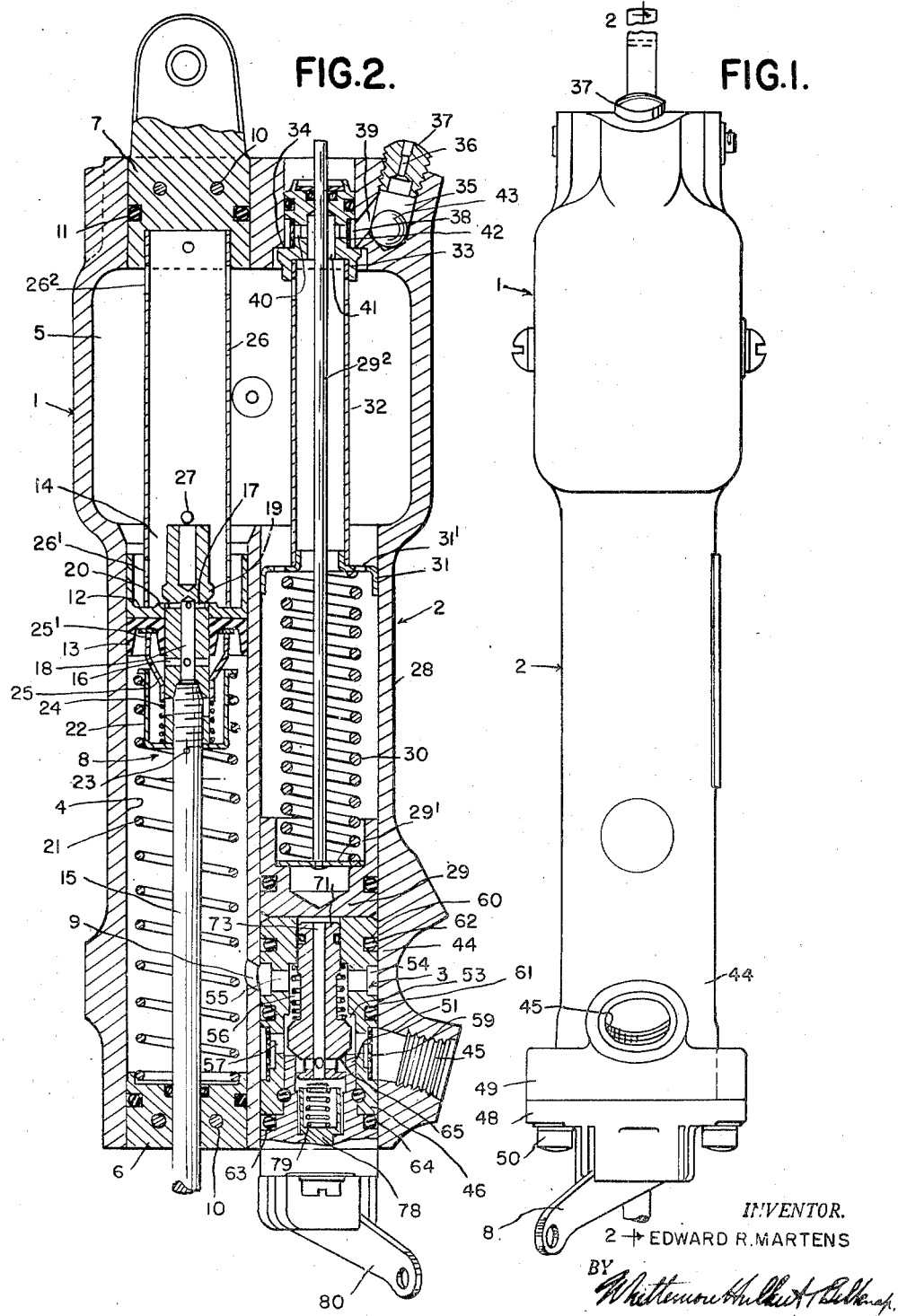

2,491,675

UNITED STATES PATENT OFFICE 2,491,675

DEVICE FOR PRODUCING FLUID UNDER PRESSURE AND FOR MAINTAINING SAID PRESSURE

Edward R. Martens, Detroit, Mich., assignor to The Warner Aircraft Corporation, Detroit, Mich., a corporation of Michigan Application November 22, 1943, Serial No. 511,333

8 Claims. (Cl. 60—54.5)

The invention relates to fluid pressure control devices and refers more particularly to devices of the type having a main mechanism for producing fluid pressure and an auxiliary mechanism for maintaining fluid pressure.

The invention has for one of its objects to provide an improved fluid pressure control device which is so constructed that the auxiliary mechanism cannot be accidentally placed in operation during the operation of the main mechanism.

The invention has for another object to provide a fluid pressure control device with an improved valve assembly for controlling the operation of the auxiliary mechanism, the assembly comprising a valve member and a manually operable actuating member which is normally shielded from the fluid pressure produced by the main mechanism during its normal operation.

The invention has for another object to so construct the valve assembly that the manually operable actuating member when subjected to fluid pressure is urged in a direction to permit the valve member to occupy its normal position without interference by the actuating member.

The invention has for a further object to provide a fluid pressure control device with an improved main fluid pressure producing mechanism having a simple construction of piston and piston rod assembly which in normal or retracted position of the parts provides for placing the cylinder of the mechanism in communication with the reservoir of the mechanism.

With these and other objects in view, the invention resides in the novel features of construction and combinations and arrangements of parts as more fully hereinafter set forth.

In the drawings:

Figure 1 is an elevation of a fluid pressure control device embodying the invention;

Figure 2 is a cross section on the line 2—2 of Figure 1;

Figure 3 is a section through the valve assembly;

Figure 4 is a cross section on the line 4—4 of Figure 3;

Figure 5 is a view similar to Figure 2 showing another embodiment of the invention.

The fluid pressure control device embodying the invention is designed particularly for use in a hydraulic brake system and especially in a hydraulic brake system of an airplane. The device in general comprises the main fluid pressure producing mechanism 1, the auxiliary fluid pressure storing mechanism 2, and the manually operable valve assembly 3 for controlling the operation of the main and auxiliary mechanisms.

The main fluid pressure producing mechanism 1 occupies a substantially vertical position and comprises the cylinder 4, the fluid reservoir 5 above the cylinder 4, the lower end fitting 6, the upper end fitting 7 and the piston and piston rod assembly 8. The cylinder 4 is provided near its lower end with the outlet 9. The fitting 6 extends within the lower end of the cylinder 4 and the fitting 7 extends within the upper wall of the reservoir 5, both fittings being secured in place by the transverse retaining pins 10. The upper end fitting is formed with an eye for receiving a pivot pin of a suitable support. Suitable rubber O rings 11 are preferably provided in annular grooves in the fittings and engaging the surrounding walls to prevent the flow of fluid between the fittings and the surrounding walls.

The piston and piston rod assembly 8 comprises a piston slidable in the cylinder 4 and a piston rod operatively connected to the piston and extending axially through the lower end fitting 6, a suitable O ring similar to the O rings 11 being provided between the rod and the lower end fitting. The piston comprises the cup-shaped body 12 and the sealing cup 13 which abuts the lower side of the bottom of the body. The sealing cup is preferably formed of rubber. The piston rod comprises the upper member 14 which extends axially through the body and sealing cup of the piston and the lower member 15 which is threaded axially into and permanently secured to the lower end of the upper member 14 and extends axially through the lower fitting 6. The upper member is formed with by-pass means for the piston to place the fluid reservoir 5 in communication with the cylinder 4 below the piston. The by-pass means comprises a passage formed of the lower and upper radial bores 16 and 17, respectively, and the axial bore 18 connecting the lower and upper radial bores. When the parts are in their normal or off positions, the lower radial bores are below the inner lip of the sealing cup 13 and the upper radial bores are above the bottom of the piston body. The upper member has the enlargement 19 above the upper radial bores 17 and forming a valve having its lower face engageable with the centrally raised face 20 of the bottom of the piston body to close the by-pass means for the piston and to also move the piston downwardly or forwardly to advance the same. 21 is a retracting coil spring encircling the lower rod member 15 and abutting the lower end fitting 6 and the cup-shaped retainer 22, which latter is sleeved on the lower rod member 15 and abuts the lower end of the upper rod member 14. A suitable cotter pin 23 secures the retainer in place. 24 is a second coil spring encircling the upper rod member 14 and abutting the retainer 22 and the retainer 25 which latter encircles the upper rod member 14 and has its upper end abutting the sealing cup 13. The retainer 25 has the openings 25'. The spring 21 is stronger than the spring 24. 26 is a tubular spacer which is secured at its upper end to the upper end fitting 7 and which abuts at its lower end the bottom of the piston body when the piston is in normal or off position. 27 is a pin which extends transversely of and is secured to the spacer and which abuts the upper end of the upper rod member when in normal or off position. When the parts are in their normal or off positions the fluid reservoir 5 is in communication with the cylinder 4 below the piston through the by-pass means in the upper rod member 14 and through the slots 25' in the retainer 25. The tubular spacer 26 has the openings 26' and 26² so that its interior is in communication with the part of the reservoir surrounding the spacer.

With the construction as thus far described, it will be seen that when the parts are in their normal or off positions, as shown in Figure 2, the fluid reservoir 5 is in communication with the cylinder 4 below the piston through the transverse openings 26' in the spacer 26, the by-pass in the upper rod member 14 and the slots 25' in the retainer 25. It will be seen that upon downward movement of the piston rod, which is secured through the instrumentality of a suitable foot pedal pivotally connected to the lower end of the lower rod member 15, the valve 19 of the upper rod member is moved downwardly into engagement with the face 20 of the piston body 12 and closes the piston by-pass means and then compels the piston to move downwardly thereby forcing the fluid under pressure through the outlet 9.

When the piston rod is relieved from downward pull, the retracting coil spring 21 cooperates with the pressure of the fluid being returned to the cylinder 4 to raise the piston rod comprising the upper and lower rod members 14 and 15. The second coil spring 24 also cooperates with the fluid pressure to return the piston comprising the piston body 12 and the sealing cup 13. The return movement continues until the bottom of the piston body 12 engages the lower end of the tubular spacer 26 followed by engagement of the upper end of the upper rod member 14 with the transverse pin 27, the coil spring 24 being deflected between the time of engagement of the bottom wall of the piston body with the tubular spacer and the time of engagement of the upper rod member with the transverse pin.

The auxiliary fluid pressure storing mechanism 2 comprises the upper cylinder 28 which is parallel to and integral with the cylinder 4 and has its upper end opening into the reservoir 5. The auxiliary mechanism also comprises the piston 29 slidable in the cylinder 28 and the coil spring 30 which at its lower end abuts the washer 29' which, in effect, forms part of the piston 29 and at its upper end abuts the retainer 31 located within the cylinder 28 and centrally telescoped into the spacer 32. The retainer is formed with the holes 31' to place the reservoir 5 in communication with the cylinder 28 above the piston 29. The spacer is transversely apertured at 32' to place its interior in communication with the portion of the reservoir 5 surrounding the spacer and the upper end of the spacer abuts the plug 33 which is resiliently held against the annular shoulder 34 in the upper wall of the reservoir by the coil spring 30.

The plug 33 is formed to provide communication between the reservoir 5 and the outside atmosphere through the passage 35 in the upper wall of the reservoir and the axial passage 36 in the plug 37, which latter is threaded into the upper wall. It will be noted that the plug 33 has the annular groove 38 registering with the branch 39 of the passage 35, the radial passages 40 leading from the annular groove and the axial passage 41 leading from the radial passages to the interior of the spacer 32. 42 is a screen preferably located in the annular groove 38 to screen the braking fluid when it is being poured into the reservoir 5 through the passage 35 when the plug 37 is removed. 43 is a ball located in the passage 35 and in normal flight attitude of the airplane occupying a lowered position providing for communication of the reservoir with the outside atmosphere. However, when the airplane is flying upside down, the ball occupies a position to close the passage 36 in the plug 37 and prevent escape of the braking fluid from the reservoir.

To indicate the position of the piston 29, there is the rod 29² fixedly secured to the washer 29' and extending upwardly through the plug 33 to a point above the upper wall of the reservoir to be seen by the pilot.

To control the operation of the fluid pressure control device, it is provided with the lower cylinder 44 for receiving the valve assembly 3. The lower cylinder is below and in axial alignment with the upper cylinder 28 and is integral with both the cylinders 4 and 28. The lower cylinder 44 has near its lower end the outlet 45 which is adapted to be connected to the wheel cylinders of the airplane landing wheel brakes by suitable tubing. The valve assembly 3 comprises a housing, a valve member, and actuating means for the valve member.

The housing is formed of the body member 46 and the coaxial base member 47 below and fixedly secured to the body member and also detachably secured to the lower end of the cylinder 44. The body member extends upwardly within the cylinder 44 so that the upper end of the body member is normally abutted by the piston 29. The base member has the flange 48 which is secured to the flange 49 of the cylinder 44 by means of the bolts 50. The base member has the upper cylindrical flange 51 which extends upwardly within the lower cylindrical end portion of the body 46 and is fixedly secured thereto by the transverse pins 52. The body member 46 is formed intermediate its ends with the chamber 53 which is located immediately above the cylindrical flange 51. The body member 46 is also formed with inlet and outlet ports leading respectively from the outlet 9 to the chamber 53 and from the chamber 53 to the outlet 45. The inlet port is formed of the upper external annular groove 54 which registers with the outlet 9, the radial passages 55 leading from the annular groove 54 and the axial passage 56 leading from the radial passages 55 to the chamber 53. The outlet port is formed of the radial passages 57 leading from the chamber 53 and the lower external annular groove 58 communicating with the radial passages 57 and registering with the outlet 45. 59 is a cylindrical screen located in the annular groove 58. The body member 46 is provided with the external annular groove 60 above the annular groove 54 and with the external annular groove 61 between the annular grooves 54 and 58, the two annular grooves 60 and 61 receiving rubber O rings 62 which are engageable with the wall of the cylinder 44 to prevent the escape of braking fluid between the body member and cylinder wall. The base member 47 and the lower end of the body member 46 also form the annular groove 63 for receiving another rubber O ring 64 to prevent the escape of the braking fluid from between the base member and the wall of the cylinder 44.

65 is the valve member which is movable longitudinally within the body member 46. The valve member has at its lower end the head 66 which is formed with the lower and upper beveled faces 67 and 68, respectively, which form valves respectively engageable with the valve seats 69 and 70. The valve seat 69 is formed by the upper inner corner of the cylindrical flange 51 while the valve seat 70 is formed by the inner corner of the body member 46 located between the chamber 53 and the axial passage 56. The valve member has the stem 71 which is axially slidable in the upper end portion of the body member 46 and also has the flange 72 which is below the head 66 of the valve member and is slidable within the cylindrical flange 51. The flange 72 is slightly larger in diameter ($\frac{1}{16}$ of an inch in the present instance) than the upper end portion of the valve stem 71. The valve member is provided with the axial passage 73 which extends therethrough and also with the radial passages 74 which are located between the head 66 and the flange 72. The valve stem is preferably provided with the external annular groove 75 for receiving the rubber O ring 76 which is engageable with the upper end portion of the body member. The valve member is normally maintained in its lowermost position, at which time the valve 67 engages the valve seat 69, by the coil spring 77 which is located within the body member and encircles the valve stem 71 and abuts the upper end wall of the axial passages 56 and the upper face of the head 66.

The actuating means for the valve member comprises the plunger 78, the coil spring 79 and the lever 80. The plunger 78 is axially slidable in the base member 47 and is coaxial with the valve member. The lower portion of the plunger is formed with an external annular groove for receiving a rubber O ring engageable with the base member while the upper portion of the plunger is cup-shaped to receive the coil spring 79. The coil spring is stronger than the coil spring 77 and its upper end is normally spaced below the flange 72 of the valve member, but is adapted upon raising of the plunger to abut the lower face of the flange 72 to raise the valve member. The lever 80 is pivotally connected to the base member 47 by the pin 81 and the lever is provided with the boss 82 engaging the lower face of the plunger 78 and with the boss 83 engageable with the lower face 84 of the base member to limit upward swinging movement of the lever and thereby limit the upward longitudinal movement of the plunger. The lever is adapted to be returned to its normal or off position by means of the coil spring 85, the normal or off position being determined by engagement of the projection 86 upon the lever engageable with the lower face of the base member. Th construction is such that when the lever 80 is swung upwardly, the plunger 78 is moved upwardly and the spring 79 is moved into engagement with the flange 72 on the lower face of the valve member 65 to thereby resiliently raise the latter. When the boss 83 of the lever engages the lower face 84 of the base member, the spring 79 resiliently holds the valve 68 against the valve seat 70, the upper end of the plunger being spaced below and clearing the lower face of the valve member. As a result, the valve member at this time may move downwardly against the resistance offered by the spring 79 to disengage the valve 68 from the seat 70.

Normally the parts of the valve assembly are in the positions shown in Figures 2 and 3, at which time the valve member 65 is resiliently held down by the coil spring 77 with the valve 67 engaging the valve seat 69. As a result, when the piston and piston rod assembly 8 of the fluid pressure producing device 1 is lowered, the braking fluid forced through the outlet 9 passes through the upper annular groove 54, radial passages 55, and axial passage 56 to the chamber 53 and then through the radial passages 57, the screen 59 and the lower annular groove 58 to the outlet 45 and then to the wheel cylinders. At this time it will also be noted that the valve member and, more particularly, its valve 67 cooperating with the valve seat 69 shields the plunger 78 from the pressure of the fluid produced by the main fluid pressure producing mechanism.

If it is decided to make the auxiliary fluid pressure storing mechanism operative, the pilot of the airplane swings the lever 80 upwardly to thereby raise the plunger 78. The raising of the plunger raises the coil spring 79 which engages the valve member 65 and raises the same so that its valve 68 engages the valve seat 70. Since the upper end of the plunger 78 is free of the lower end of the valve member 65, fluid under pressure as produced by the main mechanism passes from the outlet 9 through the upper annular groove 54, radial passages 55 and axial passage 56, lowering the valve member 65 sufficiently to pass into the chamber 53 from which the fluid may flow through the radial passages 57 and lower annular groove 58 to the outlet 45 and also through the radial passages 74 and axial passage 73 in the valve member 65 to the auxiliary mechanism. As a result, fluid under pressure flows both to the wheel cylinders of the airplane brakes through the outlet 45 and into the cylinder 28 of the auxiliary mechanism raising the piston 29 against the resistance offered by the coil spring 30. When sufficient fluid pressure has been stored in the cylinder 28 to safely hold the brakes in applied position, at which time the airplane is parked, the pilot first releases the piston and piston rod assembly 8 and then releases the lever 80 to allow them to return to their normal or off positions under the pressures exerted by the coil springs 21 and 85, respectively. At this time the pressure of the fluid which is dependent upon the coil spring 30 holds the valve member 65 in its upper position closing communication between the cylinder 28 and the outlet 9 of the cylinder 4 and placing the cylinder 28 in communication with the outlet 45, it being noted that the same fluid pressure operates upon a bottom area of the valve member which is greater than the top area.

If it is desired to release the auxiliary mechanism, the pilot may readily do so by pulling downwardly upon the lower rod member 15 and lowering the piston in the main mechanism to produce a pressure upon the upper face of the head of the valve member which together with the pressure exerted by the coil spring 77 is sufficient to overcome the differential pressure of the auxiliary mechanism acting upon the valve member. When the valve 68 has become disengaged from the valve seat 70 continued downward movement of the valve member occurs through the operation of the coil spring 77 until the valve 67 engages the valve seat 69, at which time the parts of the valve assembly are again in their normal or off position. The pilot then releases downward pull upon the piston rod to allow the same to return to its normal or off position, during which time fluid flows back from the wheel cylinders through the outlet 45, the lower annular groove 58, the radial passages 57, the chamber 53, the axial passage 56, the radial passages 55, the upper annular groove 54, and the outlet 9 into the cylinder 4. It is also apparent that excess fluid in the cylinder 4 returns to the reservoir 5 through the piston by-pass in the upper rod member 14. After the fluid has been returned, the pressure of the fluid in the chamber 53 is that of the hydraulic head in the main cylinder 4 and reservoir 5 so that the fluid stored in the auxiliary mechanism is free to exert its differential pressure upon the valve member 65 against the force exerted by the coil spring 77 to raise the valve member and disengage the valve 67 from its seat 69 permitting the fluid to flow from the auxiliary mechanism through the axial passage 73, the radial passages 74, the valve chamber 53, the axial passage 56, the radial passages 55, the upper annular groove 54 and the outlet 9 to the main mechanism until the differential pressure becomes slightly less than the strength of the spring 77. At this time the valve is then forced to its normal or off position by the spring 77.

It is to be noted that the plunger 78 is normally shielded from the fluid pressure produced by the main mechanism during service operation of the brakes and, therefore, cannot actuate the valve member. Also that when the valve member 65 is in a position such that its valve 67 clears the valve seat 69, the plunger 78 is subject to a fluid pressure urging the plunger away from and out of operative relation to the valve member so that the plunger cannot interfere with the operation of the valve member.

The modification of fluid pressure control device illustrated in Figure 5, aside from the rearrangement for making the device of the compression type instead of the tension type, is substantially the same as that of Figures 1, 2, 3 and 4. More particularly, the piston rod of the piston and piston rod assembly differs in forming the member 87 which extends axially through the piston with an upward extension 88 and also in forming the rod member 89 to extend axially downwardly through the upper end fitting 90 and the extension 88 to be threaded at its lower end into the member 87. In this modification, upward movement of the member 87 to its normal or off position is limited by limiting the upward movement of the extension 88 through the upper end fitting 90. As shown, the upper end of the extension is engageable with the bottom of the tubular spacer 91 which is secured to the upper end fitting by the cross pins 92. The tubular spacer is formed with transverse openings to place its interior in communication with the surrounding portion of the reservoir. The lower end of the spacer is engageable with the bottom of the piston to limit its upward movement.

What I claim as my invention is:

1. A fluid pressure control device comprising a chamber having an outlet, a mechanism for producing fluid pressure in said chamber, a second mechanism for storing fluid pressure and also applying fluid pressure in said chamber, a valve member normally in a position to hold said second mechanism out of communication with said first mentioned mechanism and chamber, and a manually operable actuating member for moving said valve member from normal position to a second position to place said second mechanism in communication with said chamber, said manually operable member being subjected to fluid pressure in said second mechanism and in normal position of said valve member being shielded from fluid pressure produced by said first mentioned mechanism, said valve member being movable from said second position by fluid pressure produced by said first mentioned mechanism.

2. A fluid pressure control device comprising a chamber having an outlet, a mechanism for producing fluid pressure in said chamber, a second mechanism for applying fluid pressure in said chamber, a valve member normally in a position to hold said second mechanism from communication with said chamber, and a manually operable actuating member movable from normal position relative to and toward said valve member to move said valve member to a position to place said second mechanism in communication with said chamber, said actuating member being urged toward normal position when subjected to fluid pressure in said second mentioned mechanism.

3. A fluid pressure control device comprising a chamber having an outlet, mechanism for producing fluid pressure in said chamber, auxiliary mechanism for storing fluid pressure and applying fluid pressure in said chamber, a valve member within said chamber for closing the communication between said auxiliary mechanism and chamber in one position of said valve member and also for closing the communication between said first mentioned mechanism and chamber in another position of said valve member, spring means for normally holding said valve member in said first mentioned position, means for moving said valve member from said first mentioned position to said second mentioned position, said last mentioned means comprising a manually operable member movable relative to said valve member and toward the first named position of the valve member for moving the latter to said second mentioned position, and a spring between said manually operable member and valve member for allowing movement of said valve member from the second mentioned position thereof relative to said manually operable member to open communication between said chamber and said first mentioned mechanism in response to fluid pressure produced by the latter.

4. A fluid pressure control device comprising a valve housing having a chamber, an outlet near an end of said chamber and internal longitudinally spaced valve seats, mechanism for producing fluid pressure in said chamber, auxiliary mechanism for applying fluid pressure in said chamber, a valve member longitudinally movable within said chamber and having longitudinally spaced valve elements engageable with said valve seats, said valve member having a longitudinally extending passage therethrough in communication with said auxiliary mechanism, spring means for normally holding said valve member with one of its valve elements in engagement with one of said valve seats to close the communication between said passage and said chamber, a manually operable plunger normally shielded from the fluid pressure produced within said chamber by said first mentioned mechanism, and spring means between said plunger and valve member for resiliently urging said valve member upon movement of said plunger to a position with the other of its valve elements engaging the other of said valve seats to resiliently close the communication between said first mentioned mechanism and said chamber and to place said passage in communication with said chamber.

5. A fluid pressure control device comprising a main cylinder having an outlet, a piston movable within said main cylinder for forcing fluid under pressure from said main cylinder through said outlet, a second cylinder, a third cylinder communicating with said main cylinder through said outlet and having an outlet spaced longitudinally of said third cylinder from said first mentioned outlet, a valve housing in said third cylinder having longitudinally spaced communicating ports registering with said outlets, a chamber between said ports and longitudinally spaced valve seats, a piston longitudinally movable within said second cylinder, spring means for resiliently urging said second mentioned piston toward said housing, a valve member movable within said housing and having a longitudinal fluid passage therethrough in communication with said second cylinder, said valve member having longitudinally spaced valve elements engageable with said valve seats, spring means for normally urging said valve member in a direction to engage one of its valve elements with one of said valve seats to close the communication of said passage with said chamber, a manually operable plunger, and spring means between said plunger and valve member for moving said valve member upon movement of said plunger to engage the other of said valve elements with the other of said valve seats to thereby resiliently close communication between said main cylinder and said chamber and open communication between said passage and said chamber.

6. A fluid pressure control device comprising a chamber having an outlet, a mechanism for producing fluid pressure in said chamber, a second mechanism for applying fluid pressure in said chamber, a valve member normally in a position to hold said second mechanism from communication with said chamber, a manually operable actuating member movable from normal position relative to said valve member and toward the normal position of the latter, and yieldable means between the actuating member and valve member for moving said valve member to a position to place said second mechanism in communication with said chamber.

7. A fluid pressure control device comprising a chamber having an outlet, a mechanism for producing fluid pressure in said chamber, a second mechanism for storing fluid pressure and also applying fluid pressure in said chamber, a valve member normally in a position to hold said second mechanism out of communication with said first mechanism and chamber, and a manually operable actuating member for moving said valve member from normal position to a second position to place said second mechanism in communication with said chamber, said manually operable member having resilient means engageable with said valve and permitting movement of the valve relative to said member from the second position aforesaid toward the first position in response to fluid pressure produced by said first mentioned mechanism, said manually operable member being shielded from fluid pressure produced by said first mentioned mechanism in the normal position of the valve member.

8. A fluid pressure control device comprising a main cylinder having an outlet, a piston movable within said main cylinder for forcing fluid under pressure from said main cylinder through said outlet, a second cylinder, a third cylinder communicating with said main cylinder through said outlet and having an outlet spaced longitudinally of said third cylinder from said first mentioned outlet, a valve housing in said third cylinder having longitudinally spaced communicating ports registering with said outlets, a chamber between said ports and longitudinally spaced valve seats, a piston longitudinally movable within said second cylinder, spring means for resiliently urging said second mentioned piston toward said housing, a valve member movable within said housing and having a longitudinal fluid passage therethrough in communication with said second cylinder, said valve member having longitudinally spaced valve elements engageable with said valve seats, spring means for normally urging said valve member in a direction to engage one of its valve elements with one of said valve seats to close the communication of said passage with said chamber, a manually operable plunger for moving said valve member upon movement of said plunger to engage the other of said valve elements with the other of said valve seats to thereby close communication between said main cylinder and said chamber and open communication between said passage and said chamber.

EDWARD R. MARTENS.

REFERENCES CITED

The following references are of record in the file of this patent:

UNITED STATES PATENTS

| Number | Name | Date |
| --- | --- | --- |
| 2,000,187 | Oliver | May 7, 1933 |
| 2,284,935 | White | June 2, 1942 |
| 2,342,878 | Majneri | Feb. 29, 1944 |
| 2,343,809 | Schnell | Mar. 7, 1944 |
| 2,445,855 | Majneri | July 27, 1948 |